US008442822B2

(12) United States Patent
Du et al.

(10) Patent No.: US 8,442,822 B2
(45) Date of Patent: May 14, 2013

(54) METHOD AND APPARATUS FOR SPEECH SEGMENTATION

(75) Inventors: Robert Du, Shanghai (CN); Ye Tao, Shanghai (CN); Daren Zu, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 806 days.

(21) Appl. No.: 12/519,758

(22) PCT Filed: Dec. 27, 2006

(86) PCT No.: PCT/CN2006/003612
§ 371 (c)(1),
(2), (4) Date: Dec. 29, 2009

(87) PCT Pub. No.: WO2008/077281
PCT Pub. Date: Jul. 3, 2008

(65) Prior Publication Data

US 2010/0153109 A1 Jun. 17, 2010

(51) Int. Cl.
*G10L 15/20* (2006.01)
*G10L 17/00* (2006.01)

(52) U.S. Cl.
USPC .......................................... 704/233; 704/248

(58) Field of Classification Search .................. 704/248, 704/233
See application file for complete search history.

(56) References Cited

U.S. PATENT DOCUMENTS 4,696,040 A * 9/1987 Doddington et al. ......... 704/234
4,937,870 A * 6/1990 Bossemeyer, Jr. ............ 704/241
5,524,176 A * 6/1996 Narita et al. ...................... 706/2
5,649,055 A * 7/1997 Gupta et al. .................. 704/233
5,657,760 A * 8/1997 Ying et al. .................... 600/439
5,704,200 A * 1/1998 Chmielewski et al. .... 56/10.2 E (Continued)

FOREIGN PATENT DOCUMENTS

CN 1316726 A 10/2001
DE 19625794 A1 1/1998

(Continued)

OTHER PUBLICATIONS

Francesco Beritelli, Salvatore Casale, Alfredo Cavallaro, "A Multi-Channel Speech/Silence Detector based on Time Delay Estimation and Fuzzy Classification", IEEE 1999.*

(Continued)

*Primary Examiner* — Eric Yen
(74) *Attorney, Agent, or Firm* — Blakely, Sokoloff, Taylor & Zafman LLP

(57) ABSTRACT

Machine-readable media, methods, apparatus and system for speech segmentation are described. In some embodiments, a fuzzy rule may be determined to discriminate a speech segment from a non-speech segment. An antecedent of the fuzzy rule may include an input variable and an input variable membership. A consequent of the fuzzy rule may include an output variable and an output variable membership. An instance of the input variable may be extracted from a segment. An input variable membership function associated with the input variable membership and an output variable membership function associated with the output variable membership may be trained. The instance of the input variable, the input variable membership function, the output variable, and the output variable membership function may be operated, to determine whether the segment is the speech segment or the non-speech segment.

14 Claims, 4 Drawing Sheets

U.S. PATENT DOCUMENTS

| | | | | |
|---|---|---|---|---|
| 6,215,115 | B1 * | 4/2001 | Baker et al. | 250/221 |
| 6,570,991 | B1 * | 5/2003 | Scheirer et al. | 381/110 |
| 7,716,047 | B2 * | 5/2010 | Hernandez-Abrego et al. | 704/236 |
| 2007/0183604 | A1 * | 8/2007 | Araki et al. | 381/58 |
| 2007/0271093 | A1 * | 11/2007 | Wang et al. | 704/210 |
| 2008/0294433 | A1 | 11/2008 | Yeung et al. | |

FOREIGN PATENT DOCUMENTS

| | | |
|---|---|---|
| JP | 2000339167 | 12/2000 |
| JP | 20015474 | 1/2001 |
| WO | WO-2005/070130 A2 | 8/2005 |
| WO | WO-2008/077281 A1 | 7/2008 |

OTHER PUBLICATIONS

R Culebras, J. Ramirez, J.M. Gorriz, J.C. Segura, "Fuzzy Logic Speech/Non-speech Discrimination for Noise Robust Speech Processing", ICCS 2006, May 28-31, 2006.*

First Office Action for Chinese Patent Application No. 200680056814.0, Mailed Mar. 15, 2011, 9 pages.

First Office Action for European Patent Application No. 06840655.2, Mailed Sep. 14, 2011.

First Office Action for Japanese Patent Application No. 2009-543317, Mailed Jan. 31, 2012.

Notice of Allowance for Chinese Patent Application No. 200680056814.0, Mailed Dec. 1, 2011.

Supplementary EP Search Report for European Patent Application No. 06840655.2 Mailed Aug. 25, 2011, 3 Pages.

Tao, Ye et al., "A Fuzzy Logic Based Speech Extraction Approach for E-Learning Content Production", Audio, Language and Image Processing, 2008. ICALIP 2008. International conference on, IEEE, Piscataway, NJ, USA, Jul. 7, 2008, XP031298413, 5 Pages.

Notice of Final Rejection for Korean Patent Application No. 10-2009-7013177, Mailed Aug. 31, 2011, 5 Pages.

Ellen Moyse, International Preliminary Report on Patentability, Patent Cooperation Treaty, Jun. 30, 2009, 5 pages, PCT/CN2006/003612, The International Bureau of WIPO, Geneva, Switzerland.

Eric Scheirer et al., Construction and Evaluation of a Robust Multifeature Speech/Music Discriminator, 1997, 4 pages, Palo Alto, California, USA.

Lie Lu et al., Content Analysis for Audio Classification and Segmentation, IEEE Transactions on Speech and Audio Processing, Oct. 2002, 13 pages, vol. 10, No. 7.

Yi Tan, International Search Report and the Written Opinion, Patent Cooperation Treaty, Sep. 20, 2007, 11 pages, PCT/CN2006/003612, The State Intellectual Property Office, Beijing, China.

Notice of Preliminary Rejection for Korean Patent Application No. 10-2009-7013177, Mailed Dec. 20, 2010, 7 pages.

Beritelli, Francesco , et al., "A Robust Voice Activity Detector for Wireless Communications Using Soft Computing", IEEE Journal on Selected Areas in Communications, vol. 16, No. 9, (Dec. 1998), pp. 1818-1829.

* cited by examiner

METHOD AND APPARATUS FOR SPEECH SEGMENTATION

CROSS REFERENCE TO RELATED APPLICATION

This patent application is a U.S. National Phase application under 35 U.S.C. §371 of International Application No. PCT/CN2006/003612, filed on Dec. 27, 2006, entitled METHOD AND APPARATUS FOR SPEECH SEGMENTATION.

BACKGROUND

Speech segmentation may be a step of unstructured information retrieval to classify the unstructured information into speech segments and non-speech segments. Various methods may be applied for speech segmentation. The most commonly used method is to manually extract speech segments from a media resource that discriminates a speech segment from a non-speech segment.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes techniques for method and apparatus for speech segmentation. In the following description, numerous specific details such as logic implementations, pseudo-code, means to specify operands, resource partitioning/sharing/duplication implementations, types and interrelationships of system components, and logic partitioning/integration choices are set forth in order to provide a more thorough understanding of the current invention. However, the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, that may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.) and others.

Figure 1:
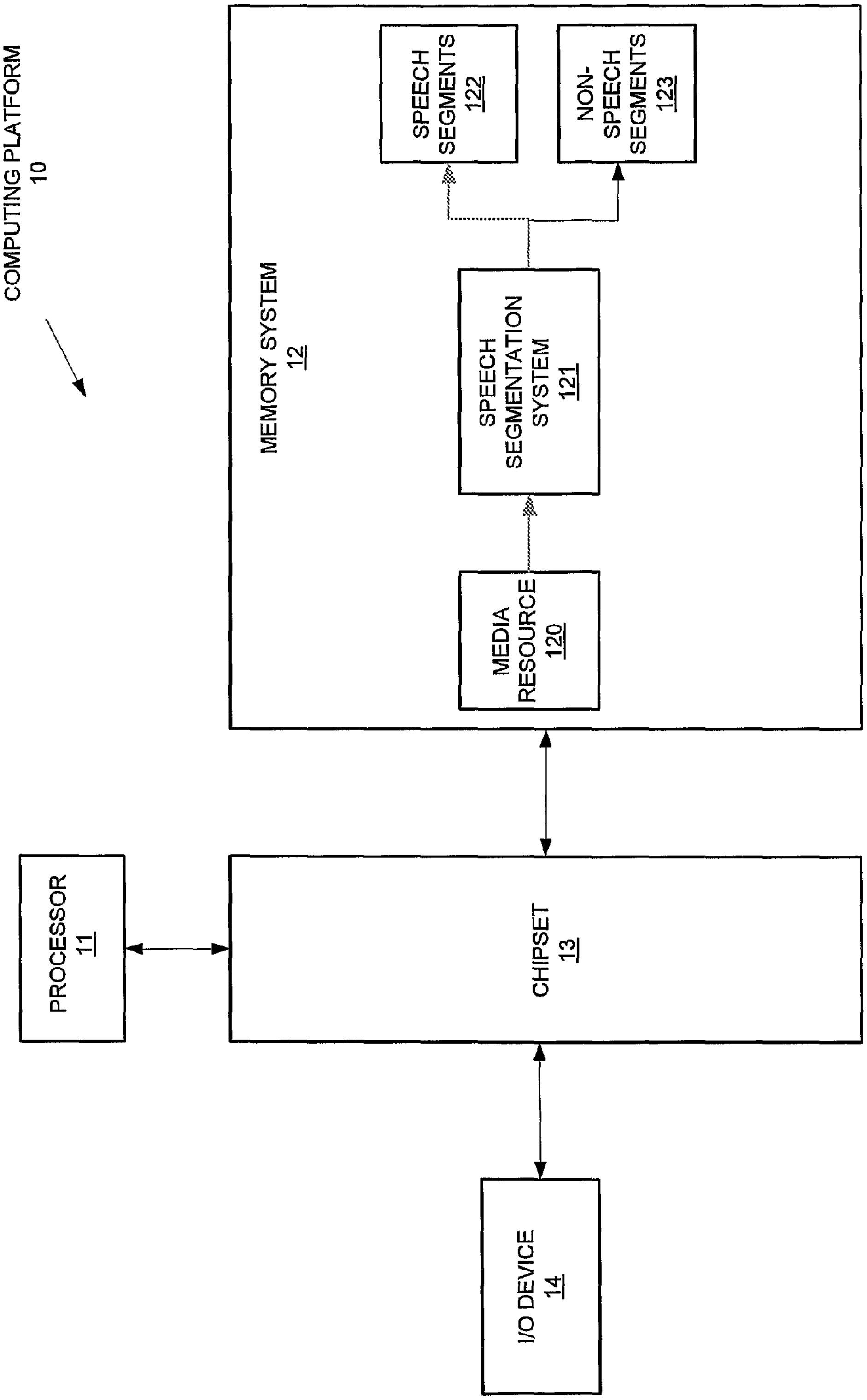
FIG. 1 shows an embodiment of a computing platform that comprises a speech segmentation system.

An embodiment of a computing platform 10 comprising a speech segmentation system 121 is shown in FIG. 1. Examples for the computing platform may include mainframe computer, mini-computer, personal computer, portable computer, laptop computer and other devices for transceiving and processing data.

The computing platform 10 may comprise one or more processors 11, memory 12, chipset 13, I/O device 14 and possibly other components. The one or more processors 11 are communicatively coupled to various components (e.g., the memory 12) via one or more buses such as a processor bus. The processors 11 may be implemented as an integrated circuit (IC) with one or more processing cores that may execute codes. Examples for the processor 20 may include Intel® Core™, Intel® Celeron™, Intel® Pentium™, Intel® Xeon™, Intel® Itanium™ architectures, available from Intel Corporation of Santa Clara, Calif.

The memory 12 may store codes to be executed by the processor 11.

Examples for the memory 12 may comprise one or a combination of the following semiconductor devices, such as synchronous dynamic random access memory (SDRAM) devices, RAMBUS dynamic random access memory (RDRAM) devices, double data rate (DDR) memory devices, static random access memory (SRAM), and flash memory devices.

The chipset 13 may provide one or more communicative path among the processor 11, the memory 12, the I/O devices 14 and possibly other components. The chipset 13 may further comprise hubs to respectively communicate with the above-mentioned components. For example, the chipset 13 may comprise a memory controller hub, an input/output controller hub and possibly other hubs.

The I/O devices 14 may input or output data to or from the computing platform 10, such as media data. Examples for the I/O devices 14 may comprise a network card, a blue-tooth device, an antenna, and possibly other devices for transceiving data.

In the embodiment as shown in FIG. 1, the memory 12 may further comprise codes implemented as a media resource 120, speech segmentation system 121, speech segments 122 and non-speech segments 123.

The media resource 120 may comprise audio resource and video resource. Media resource 120 may be provided by various components, such as the I/O devices 14, a disc storage (not shown), and an audio/video device (not shown).

The speech segmentation system 121 may split the media 120 into a number of media segments, determine if a media segment is a speech segment 122 or a non-speech segment 123, and label the media segment as the speech segment 122 or the non-speech segment 123. Speech segmentation may be useful in various scenarios. For example, speech classification and segmentation may be used for audio-text mapping. In this scenario, the speech segments 122 may go through an audio-text alignment so that a text mapping with the speech segment is selected.

The speech segmentation system 121 may use fuzzy inference technologies to discriminate the speech segment 122 from the non-speech segment 123. More details are provided in FIG. 2.

Figure 2:
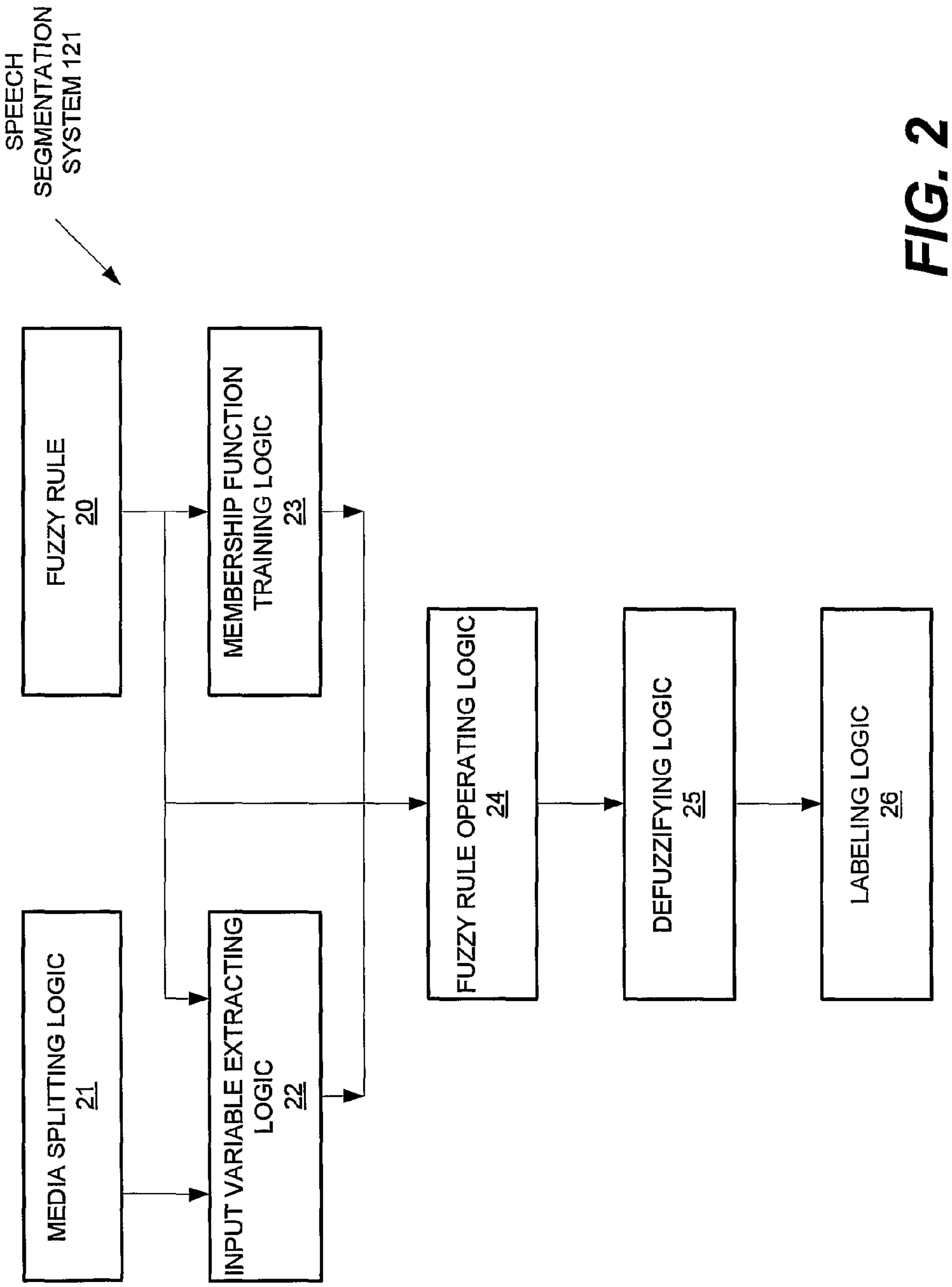
FIG. 2 shows an embodiment of the speech segmentation system.

FIG. 2 illustrates an embodiment of the speech segmentation system 121. The speech segmentation system 121 may comprise a fuzzy rule 20, a media splitting logic 21, an input variable extracting logic 22, a membership function training logic 23, a fuzzy rule operating logic 24, a defuzzifying logic 25, a labeling logic 26, and possibly other components for speech segmentation.

Fuzzy rule 20 may store one or more fuzzy rules, which may be determined based upon various factors, such as characteristics of the media 120 and prior knowledge on speech data. The fuzzy rule may be a linguistic rule to determine whether a media segment is speech or non-speech and may take various forms, such as if-then form. An if-then rule may comprise an antecedent part (if) and a consequent part (then). The antecedent may specify conditions to gain the consequent.

The antecedent may comprise one or more input variables indicating various characteristics of media data. For example, the input variable may be selected from a group of features including a high zero-crossing rate ratio (HZCRR), a percentage of "low-energy" frames (LEFP), a variance of spectral centroid (SCV), a variance of spectral flux (SFV), a variance of spectral roll-off point (SRPV) and a 4 Hz modulation energy (4 Hz). The consequent may comprise an output variable. In the embodiment of FIG. 2, the output variable may be speech-likelihood.

The following may be an example of the fuzzy rule used for a media under a high SNR (signal noise ratio) environment.

Rule one: if LEFP is high or SFV is low, then speech-likelihood is speech; and

Rule two: if LEFP is low and HZCRR is high, then speech-likelihood is non-speech.

The following may be another example of the fuzzy rule used for a media under a low SNR environment.

Rule one: if HZCRR is low, then speech-likelihood is non-speech;

Rule two: if LEFP is high then speech-likelihood is speech;

Rule three: if LEFP is low then speech-likelihood is non-speech;

Rule four: if SCV is high and SFV is high and SRPV is high, then speech-likelihood is speech;

Rule five: if SCV is low and SFV is low and SRPV is low, then speech-likelihood is non-speech;

Rule six: if 4 Hz is very high, then speech-likelihood is speech; and

Rule seven: if 4 Hz is low, then speech-likelihood is non-speech.

Each statement of the rule may admit a possibility of a partial membership in it. In other words, each statement of the rule may be a matter of degree that the input variable or the output variable belongs to a membership. In the above-stated rules, each input variable may employ two membership functions defined as: "low" and "high". The output variable may employ two membership functions defined as "speech" and "non-speech". It should be appreciated that the fuzzy rule may associate different input variables with different membership functions. For example, input variable LEFP may employ "medium" and "low" membership functions, while input variable SFV may employ "high" and "medium" membership functions.

Membership function training logic 23 may train the membership functions associated with each input variable. The membership function may be formed in various patterns. For example, the simplest membership function may be formed in a straight line, a triangle or a trapezoidal. The two membership functions may be built on the Gaussian distribution curve: a simple Gaussian curve and a two-sided composite of two different Gaussian curves. The generalized bell membership function is specified by three parameters.

Media splitting logic 21 may split the media resource 120 into a number of media segments, for example, each media segment in a 1-second window. Input variable extracting logic 22 may extract instances of the input variables from each media segment based upon the fuzzy rule 20. Fuzzy rule operating logic 24 may operate the instances of the input variables, the membership functions associated with the input variables, the output variable and the membership function associated with the output variable based upon the fuzzy rule 20, to obtain an entire fuzzy conclusion that may represent possibilities that the output variable (i.e., speech-likelihood) belongs to a membership (i.e., speech or non-speech).

Defuzzifying logic 25 may defuzzify the fuzzy conclusion from the fuzzy rule operating logic 24 to obtain a definite number of the output variable. A variety of methods may be applied for the defuzzification. For example, a weighted-centroid method may be used to find the centroid of a weighted aggregation of each output from each fuzzy rule. The centroid may identify the definite number of the output variable (i.e., the speech-likelihood).

Labeling logic 26 may label each media segment as a speech segment or a non-speech segment based upon the definite number of the speech-likelihood for this media segment.

Figure 3:
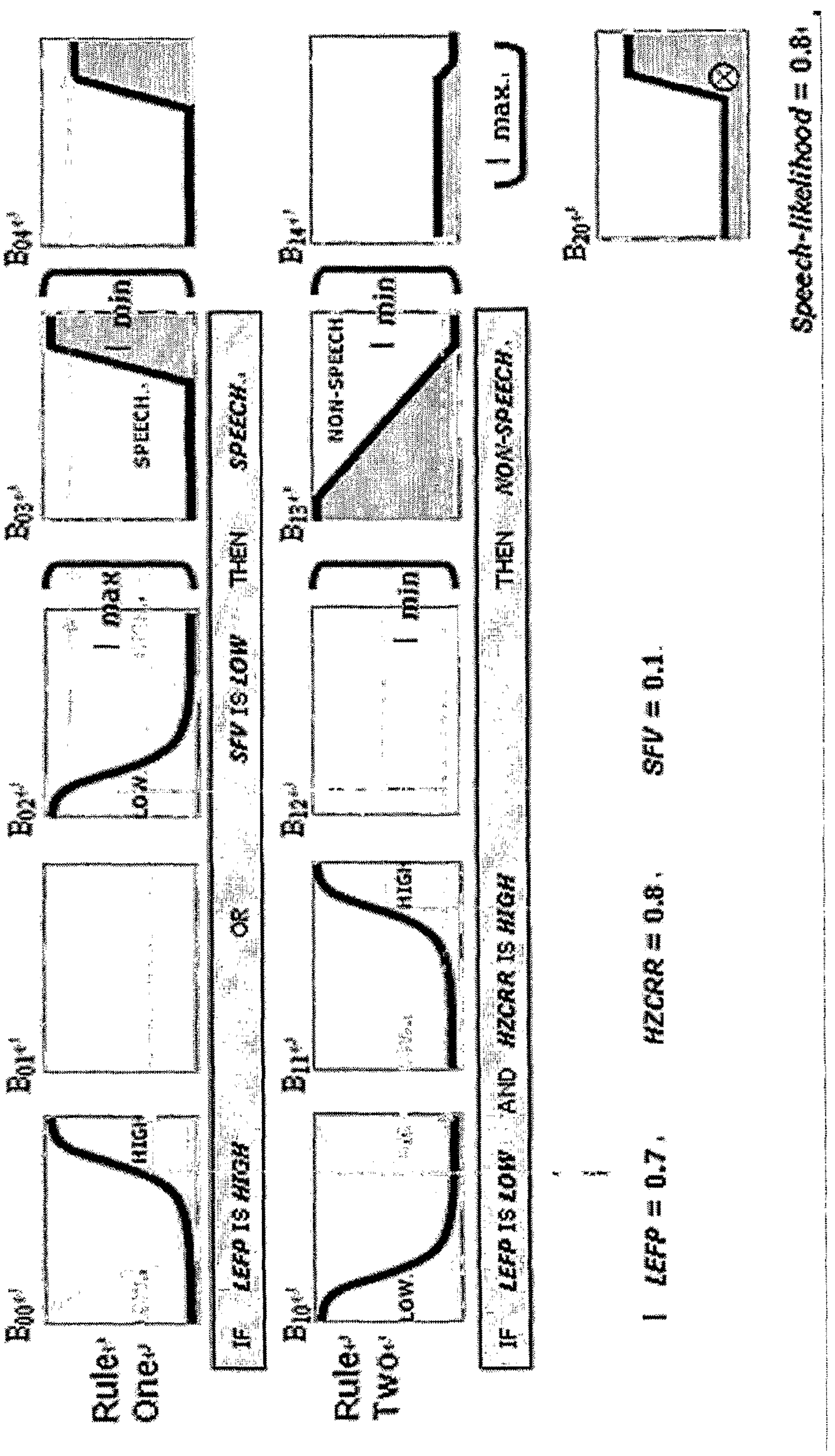
FIG. 3 shows an embodiment of a fuzzy rule and how the speech segmentation system operates the fuzzy rule to determine whether a segment is speech or not.

FIG. 3 illustrates an embodiment of the fuzzy rule 20 and how the speech segmentation system 121 operates the fuzzy rule to determine whether a segment is speech or not. As illustrated, the fuzzy rule 20 may comprise two rules:

Rule one: if LEFP is high or SFV is low, then speech-likelihood is speech; and

Rule two: if LEFP is low and HZCRR is high, then speech-likelihood is non-speech.

Firstly, the fuzzy rule operating logic 24 may fuzzify each input variable of each rule based upon the extracted instances of the input variables and the membership functions. As stated-above, each statement of the fuzzy rule may admit a possibility of partial membership in it and the truth of the statement may become a matter of degree. For example, the statement 'LEFP is high' may admit a partial degree that LEFP is high. The degree that LEFP belongs to the "high" membership may be denoted by a membership value between 0 and 1. The "high" membership function associated with LEFP as shown in the block $B_{00}$ of FIG. 3 may map a LEFP instance to its appropriate membership value. A process of utilizing the membership function associated with the input variable and the extracted instance of the input variable (e.g., LEFP=0.7, HZCRR=0.8, SFV=0.1) to obtain a membership value may be called as "fuzzifying input". Therefore, as shown in FIG. 3, the input variable "LEFP" of rule one may be fuzzified into the "high" membership value 0.4. Similarly, the input variable "SFV" of rule one may be fuzzified into the "low" membership value 0.8; the input variable "LEFP" of rule two may be fuzzified into "low" membership value 0.1; and the input variable "HZCRR" may be fuzzified into "high" membership value 0.5.

Secondly, the fuzzy rule operating logic 24 may operate the fuzzified inputs of each rule to obtain a fuzzified output of the rule. If the antecedent of the rule comprises more than one part, a fuzzy logical operator (e.g., AND, OR, NOT) may be used to obtain a value representing a result of the antecedent. For example, rule one may have two parts "LEFP is high" and "SFV is low". Rule one may utilize the fuzzy logical operator "OR" to take a maximum value of the fuzzified inputs, i.e., the maximum value 0.8 of the fuzzified inputs 0.4 and 0.8, as the result of the antecedent of rule one. Rule two may have two other parts "LEFP is low" and "HZCRR is high". Rule two may utilize the fuzzy logic operator "AND" to take a minimum value of the fuzzified inputs, i.e., the minimum value 0.1 of the fuzzified inputs 0.1 and 0.5, as the result of the antecedent of rule two.

Thirdly, for each rule, the fuzzy rule operating logic 24 may utilize a membership function associated with the output variable "speech-likelihood" and the result of the rule antecedent to obtain a set of membership values indicating a set of degrees that the speech-likelihood belongs to the membership (i.e., speech or non-speech). For rule one, the fuzzy rule operating logic 24 may apply an implication method to reshape the "speech" membership function by limiting the highest degree that the speech-likelihood belongs to "speech" membership to the value obtained from the antecedent of rule one, i.e., the value 0.8. Block $B_{04}$ of FIG. 3 shows a set of degrees that the speech-likelihood may belong to "speech" membership for rule one. Similarly, block $B_{14}$ of FIG. 3 shows another set of degrees that the speech-likelihood may belong to "non-speech" membership for rule two.

Fourthly, the defuzzifying logic 25 may defuzzify the output of each rule to obtain a defuzzified value of the output variable "speech-likelihood". The output from each rule may be an entire fuzzy set that may represent degrees that the output variable "speech-likelihood" belongs to a membership. A process of obtain an absolute value of the output is called "defuzzification". A variety of methods may be applied for the defuzzification. For example, the defuzzifying logic 25 may obtain the absolute value of the output by utilizing the above-stated weighted-centroid method.

More specifically, the defuzzifying logic 25 may assigning a weight to each output of each rule, such as the set of degrees as shown in block $B_{04}$ of FIG. 3 and the set of degrees as shown in block $B_{14}$ of FIG. 3. For example, the defuzzifying logic 25 may assign weight "1" to the output of rule one and the output of rule two. Then, the defuzzifying logic 25 may aggregate the weighted outputs and obtain a union that may define a range of output values. Block $B_{20}$ of FIG. 3 may show the result of the aggregation. Finally, the defuzzifying logic 25 may find a centroid of the aggregation as the absolute value of the output "speech-likelihood". As shown in FIG. 3, the speech-likelihood value may be 0.8, upon which the speech segmentation system 121 may determine whether the media segment is speech or non-speech.

Figure 4:
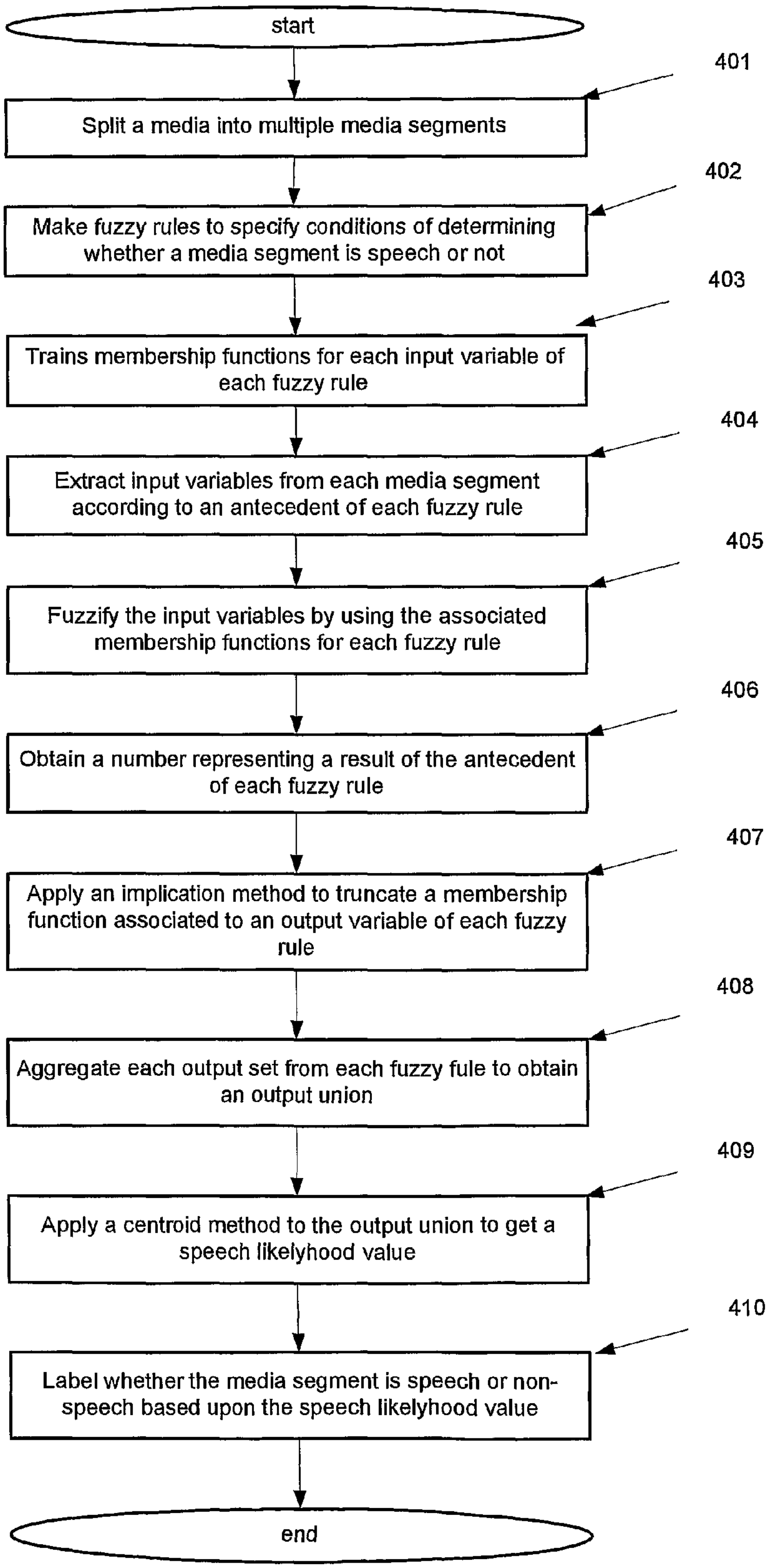
FIG. 4 shows an embodiment of a method of speech segmentation by the speech segmentation system.

FIG. 4 shows an embodiment of a method of speech segmentation by the speech segmentation system 121. In block 401, the media splitting logic 21 may split the media 120 into a number of media segments, for example, each media segment in a 1-second window. In block 402, the fuzzy rule 20 may comprise one or more rules that may specify conditions of determining whether a media segment is speech or non-speech. The fuzzy rules may be determined based upon characteristics of the media 120 and prior knowledge on speech data.

In block 403, the membership function training logic 23 may train membership functions associated with each input variable of each fuzzy rule. The membership function training logic 23 may further train membership functions associated with the output variable "speech-likelihood" of the fuzzy rule. In block 404, the input variable extracting logic 22 may extract the input variable from each media segment according to the antecedent of each fuzzy rule. In block 405, the fuzzy rule operating logic 24 may fuzzify each input variable of each fuzzy rule by utilizing the extracted instance of the input variable and the membership function associated with the input variable.

In block 406, the fuzzy rule operating logic 24 may obtain a value representing a result of the antecedent. If the antecedent comprises one part, then the fuzzified input from that part may be the value. If the antecedent comprises more than one parts, the fuzzy rule operating logic 24 may obtain the value by operating each fuzzified input from each part with a fuzzy logic operator, e.g., AND, OR or NOT, as denoted by the fuzzy rule. In block 407, the fuzzy rule operating logic 24 may apply an implication method to truncate the membership function associated to the output variable of each fuzzy rule. The truncated membership function may define a range of degrees that the output variable belongs to the membership.

In block 408, the defuzzifying logic 25 may assign a weight to each output from each fuzzy rule and aggregate the weighted output to obtain an output union. In block 409, the defuzzifying logic 25 may apply a centroid method to find a centroid of the output union as a value of the output variable "speech-likelihood". In block 410, the labeling logic 26 may label whether the media segment is speech or non-speech based upon the speech-likelihood value.

While certain features of the invention have been described with reference to example embodiments, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A computer-implemented method performing, via a processor, operations of:

determining a fuzzy rule to discriminate a speech segment from a non-speech segment, wherein an antecedent of the fuzzy rule includes an input variable indicating a characteristic of media data and an input variable membership, and wherein a consequent of the fuzzy rule includes an output variable indicating a likelihood of the media data being speech and an output variable membership;

extracting an instance of the input variable from a segment;

training an input variable membership function associated with the input variable membership and an output variable membership function associated with the output variable membership;

operating the instance of the input variable, the input variable membership function, the output variable, and the output variable membership function, to determine whether the segment is the speech segment or the non-speech segment;

fuzzifying the input variable based upon the instance of the input variable and the input variable membership function, to provide a fuzzified input indicating a first degree that the input variable belongs to the input variable membership;

reshaping the output variable membership function based upon the fuzzified input, to provide an output set indicating a group of a second degree that the output variable belongs to the output variable membership;

defuzzifying the output set to provide a defuzzified output;

labeling whether the segment is the speech segment or the non-speech segment based upon the defuzzied output;

finding a centroid of the output set to provide the defuzzified output, if the fuzzy rule comprises one rule;

multiplying each of a plurality of weights with the output set obtained through each of the plurality of rules, to provide each of a plurality of weighted output sets, if the fuzzy rule comprises a plurality of rules;

aggregating the plurality of weighted output sets to provide an output union; and finding a centroid of the output union to provide the defuzzied output.

2. The method of claim 1, wherein the antecedent admits a first partial degree that the input variable belongs to the input variable membership.

3. The method of claim 1, wherein the consequent admits a second partial degree that the output variable belongs to the output variable membership.

4. The method of claim 1, wherein the input variable comprises at least one variable selected from a group of percentage of low-energy frames (LEFP), high zero-crossing rate ratio (HZCRR), variance of spectral centroid (SCV), variance of spectral flux (SFV), variance of spectral roll-off point (SRPV) and 4 Hz modulation energy (4 Hz).

5. The method of claim 4, wherein the output variable is speech-likelihood.

6. The method of claim 5, wherein the fuzzy rule comprises:

a first rule stating that if LEFP is high or SFV is low, then the speech-likelihood is speech; and a second rule stating that if LEFP is low and HZCRR is high, then the speech-likelihood is non-speech.

7. The method of claim 5, wherein the fuzzy rule comprises:

a first rule stating that if HZCRR is low, then the speech-likelihood is non-speech;

a second rule stating that if LEFP is high, then the speech-likelihood is speech;

a third rule stating that if LEFP is low, then the speech-likelihood is non-speech;

a fourth rule stating that if SCV is high and SFV is high and SRPV is high, then the speech-likelihood is speech;

a fifth rule stating that if SCV is low and SFV is low and SRPV is low, then the speech-likelihood is non-speech;

a sixth rule stating that if 4 Hz is high, then the speech-likelihood is speech; and a seventh rule stating that if 4 Hz is low, then the speech-likelihood is non-speech.

8. A non-transitory machine-readable medium comprising a plurality of instructions which when executed result in a system cause a machine to perform one or more operations comprising:

determining a fuzzy rule to discriminate a speech segment from a non-speech segment, wherein an antecedent of the fuzzy rule includes an input variable indicating a characteristic of media data and an input variable membership, and wherein a consequent of the fuzzy rule includes an output variable indicating a likelihood of the media data being speech and an output variable membership;

extracting an instance of the input variable from a segment;

training an input variable membership function associated with the input variable membership and an output variable membership function associated with the output variable membership;

operating the instance of the input variable, the input variable membership function, the output variable, and the output variable membership function, to determine whether the segment is the speech segment or the non-speech segment;

fuzzifying the input variable based upon the instance of the input variable and the input variable membership function, to provide a fuzzified input indicating a first degree that the input variable belongs to the input variable membership;

reshaping the output variable membership function based upon the fuzzified input, to provide an output set indicating a group of a second degree that the output variable belongs to the output variable membership;

defuzzifying the output set to provide a defuzzified output;

labeling whether the segment is the speech segment or the non-speech segment based upon the defuzzied output;

finding a centroid of the output set to provide the defuzzified output, if the fuzzy rule comprises one rule;

multiplying each of a plurality of weights with the output set obtained through each of the plurality of rules, to provide each of a plurality of weighted output sets, if the fuzzy rule comprises a plurality of rules; and aggregating the plurality of weighted output sets to provide an output union; and finding a centroid of the output union to provide the defuzzied output.

9. The machine readable medium of claim 8, wherein the antecedent admits a first partial degree that the input variable belongs to the input variable membership.

10. The machine readable medium of claim 8, wherein the consequent admits a second partial degree that the output variable belongs to the output variable membership.

11. The machine readable medium of claim 8, wherein the input variable comprises at least one variable selected from a group of percentage of low-energy frames (LEFP), high zero-crossing rate ratio (HZGRR), variance of spectral centroid (SGV), variance of spectral flux (SFV), variance of spectral roll-off point (SRPV) and 4 Hz modulation energy (4 Hz).

12. The machine readable medium of claim 11, wherein the output variable is speech-likelihood.

13. The machine readable medium of claim 12, wherein the fuzzy rule comprises:

a first rule stating that if LEFP is high or SPV is low, then the speech-likelihood is speech; and a second rule stating that if LEFP is low and HZCRR is high, then the speech-likelihood is non-speech.

14. The machine readable medium of claim 12, wherein the fuzzy rule comprises:

a first rule stating that if HZCRR is low, then the speech-likelihood is non-speech;

a second rule stating that if LEFP is high, then the speech-likelihood is speech;

a third rule stating that if LEFP is low, then the speech-likelihood is non-speech;

a fourth rule stating that if SCV is high and SFV is high and SRPV is high, then the speech-likelihood is speech;

a fifth rule stating that if SCV is low and SFV is low and SRPV is low, then the speech-likelihood is non-speech;

a sixth rule stating that if 4 Hz is high, then the speech-likelihood is speech; and a seventh rule stating that if 4 Hz is low, then the speech-likelihood is non-speech.

* * * * *